Feb. 6, 1951          O. H. DICKE          2,540,076
RADIO CYCLE SUMMATION MEASURING APPARATUS
Filed Sept. 28, 1944          3 Sheets—Sheet 2
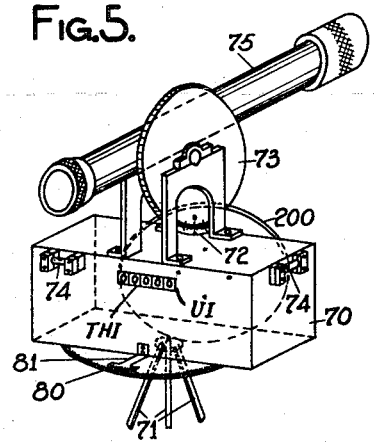
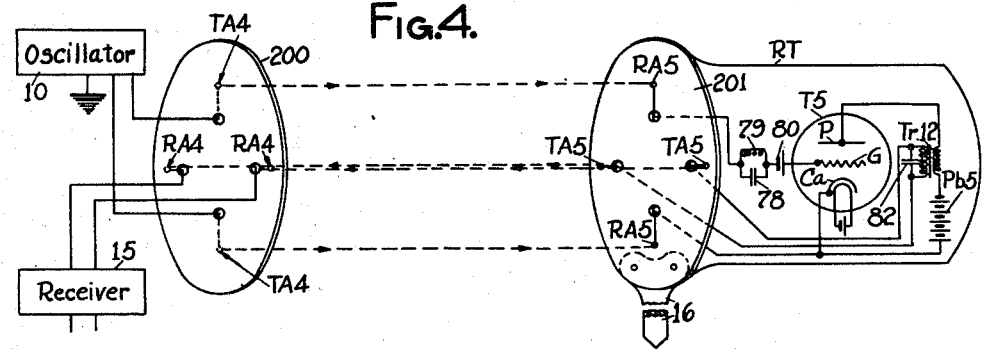
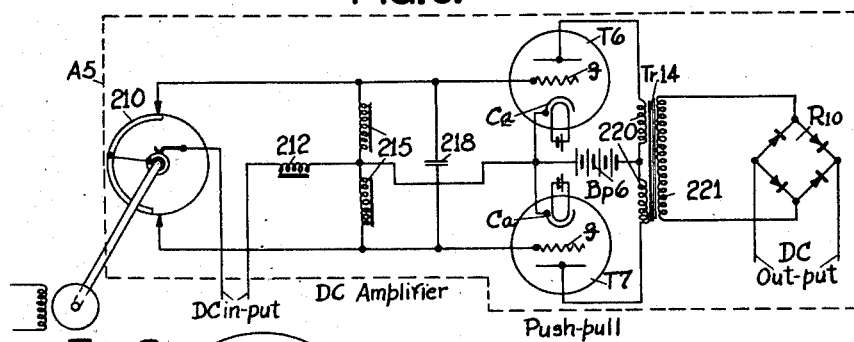
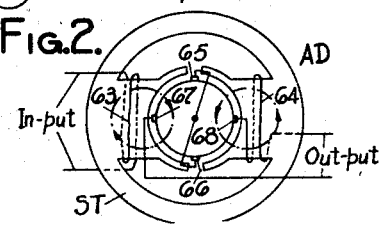
Inventor
O. H. Dicke Feb. 6, 1951     O. H. DICKE     2,540,076
RADIO CYCLE SUMMATION MEASURING APPARATUS
Filed Sept. 28, 1944     3 Sheets-Sheet 3
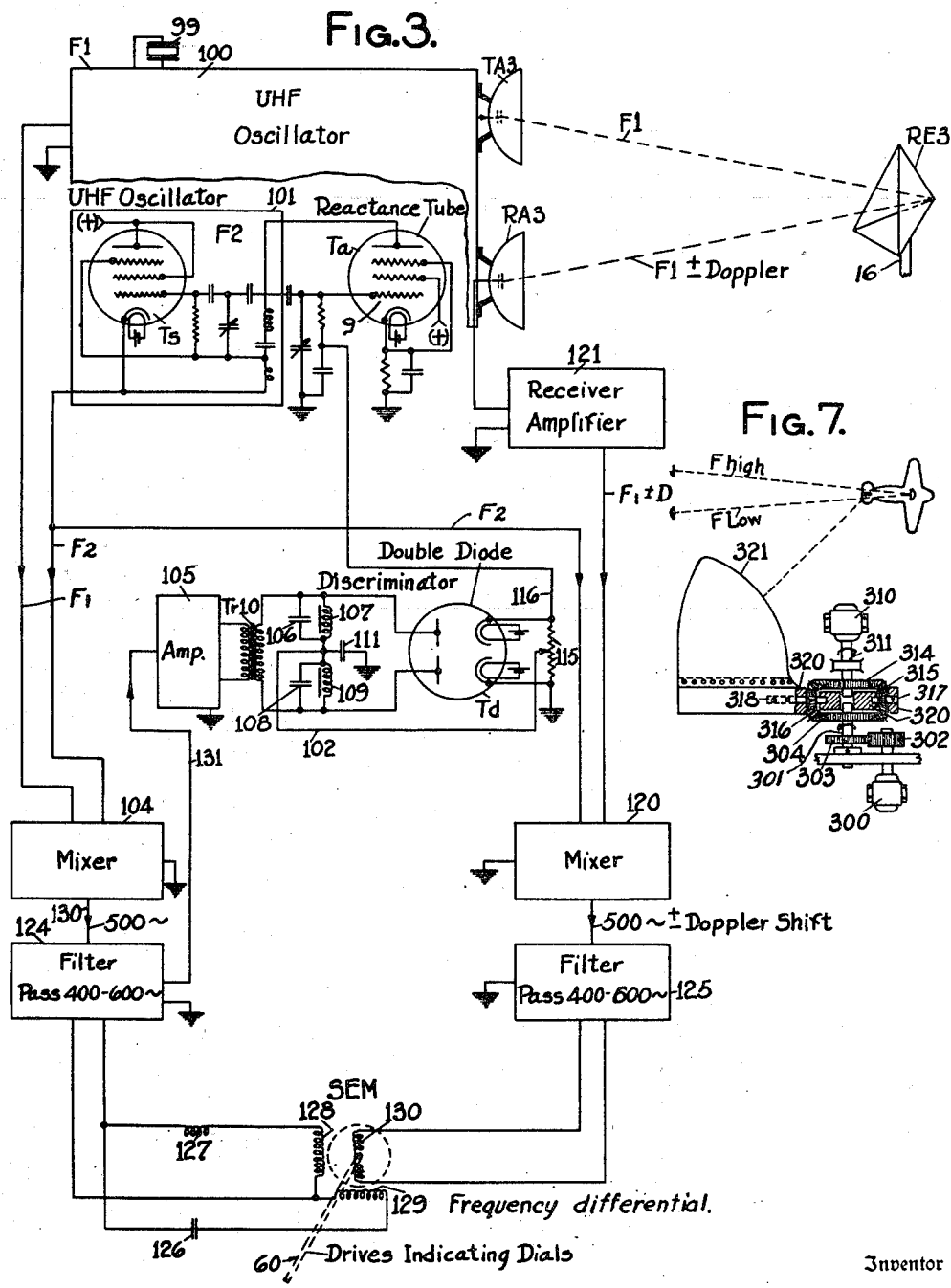
Inventor
O. H. Dicke Patented Feb. 6, 1951

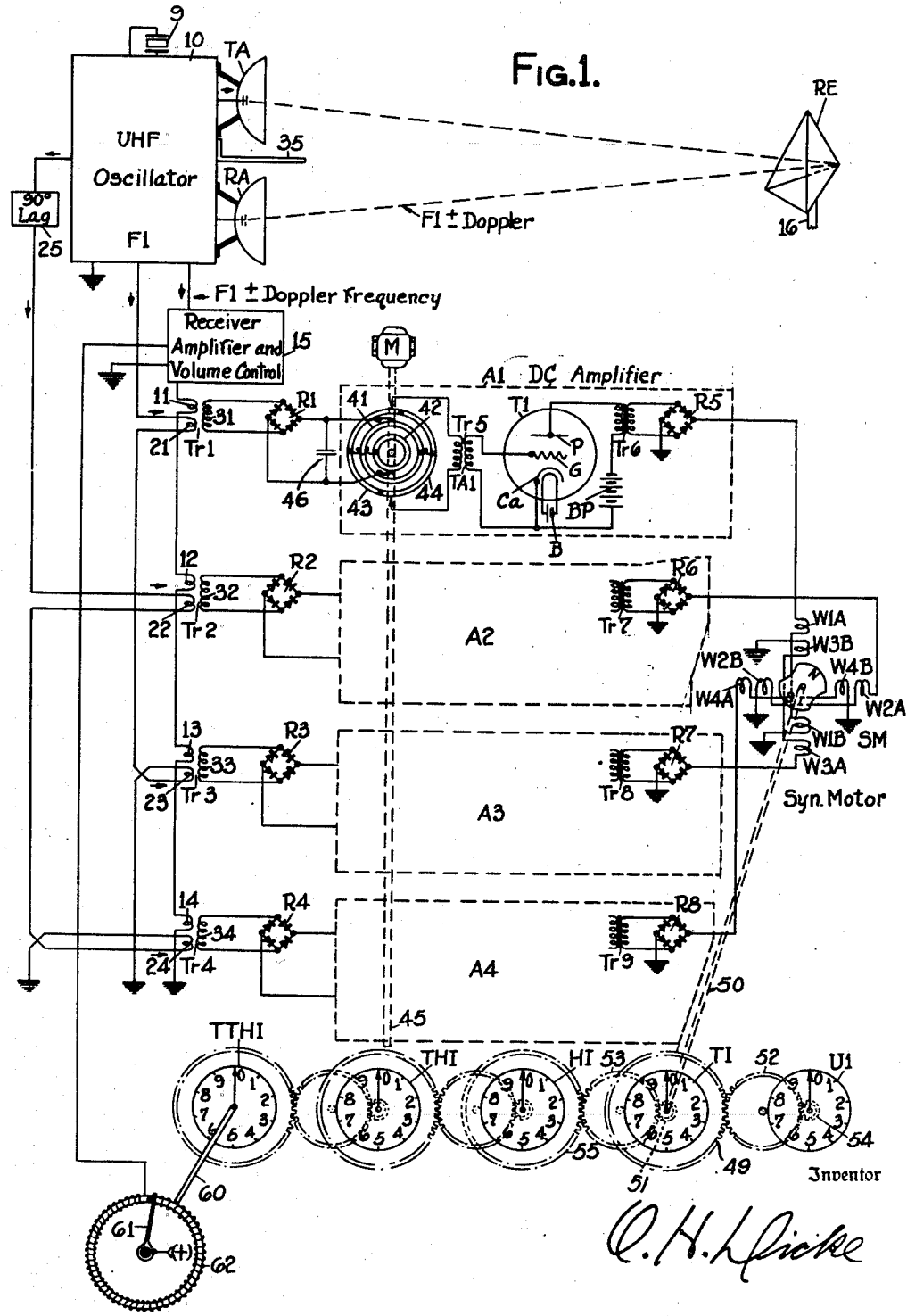

2,540,076

UNITED STATES PATENT OFFICE 2,540,076

RADIO CYCLE SUMMATION MEASURING APPARATUS

Oscar H. Dicke, Rochester, N. Y.

Application September 28, 1944, Serial No. 556,149

13 Claims. (Cl. 343—12)

This invention relates to electronic measuring apparatus and more particularly to apparatus capable of measuring distances electronically to the same per cent of accuracy that the frequency of an ultra-high frequency current can be maintained constant. It is understood that currents controlled by piezo crystal controlled electronic oscillators will maintain the frequency constant within about one thousandths of one per cent.

In accordance with this invention the inaccuracies of triangulation are not to be tolerated, it being an object of this invention to generate ultra-high frequency radio energy and radiate it over the line over which a measurement is to be made through an angle of spread wide enough to enable a walking man or a moving vehicle, to stay therewithin and to then move suitable radio reflecting, or reradiating, means from one point to another point on said line to be measured, and to accurately measure the number of radio waves and fractions thereof which are in transit, that is, are in the course of being transmitted from said one point to said reflector located at said other point and then back to said one point.

Another object of this invention resides in the provision of apparatus to measure the relative phase shifts between two ultra-high frequency currents accurately and accumulatively over a plurality of cycles.

Another object of this invention resides in the provision of two separate radio frequency oscillators one of which has its frequency made as constant as possible as by a piezoelectric plate and the other of which is held at a predetermined difference frequency as by means to so govern the frequency of the second oscillator by alternating current derived from a mixer fed by both of said oscillators that the frequency of the current delivered by said mixer is substantially constant or at least does not fluctuate in excess, say, 25 per cent on either side of its average value.

Another object of the present invention resides in the provision of a motor operated in accordance with the Doppler frequency or phase shift (the difference in frequency between the transmitted and reflected frequencies current frequencies over a variable distance) and to drive units and/or tens and/or hundreds, etc. indicators thereby through the medium of a suitable train of gears.

Another object of the invention resides in the provision of suitable sighting means whereby the transmitter-receiver may be properly sighted over the line over which a measurement is to be made together with angle reading verniers for reading the angle between two such lines.

Another object of the present invention resides in the provision of means for obtaining a rotating magnetic field in an iron core proportional to the Doppler frequency directly from the radio frequencies and without the use of an intermediate modulating or mixer frequency.

Another object of the invention resides in the provision of a regenerator for creating radio frequency energy polarized in one plane from radio frequency energy polarized in a plane at a right angle thereto together with means for supporting said regenerator in balanced relation by a single leg.

Another object of the invention resides in the provision of the elements of a surveyor's transit with the radio transmitting and receiving apparatus mounted between the horizontal vernier and the vertical vernier supporting a telescope.

Another object of the present invention resides in its application to the measurement of the absolute altitude of an airplane by using the earth's surface as a reflector.

Other objects, purposes and characteristic features of the invention will appear as the description of the invention progresses and will in part become obvious from the accompanying drawings of which:

Fig. 1 illustrates one form of the present invention in which a synchronous motor drives the indicator;

Fig. 2 shows a D. C. amplifier of the D. C. generator type which may be substituted for the D. C. amplifier shown in Fig. 1;

Fig. 3 illustrates a modified form of the invention shown in Fig. 1 and which employs a frequency-differential motor for driving the indicator;

Fig. 4 illustrates how the transmitting antenna and receiving antenna may be mounted in the same focusing structure by the provision of a transmitting di-pole and a receiving di-pole disposed at right angles to each other, and also shows means employing in place of the radio reflector a radio receiving di-pole, a tuned amplifier and a transmitting di-pole, the latter two di-poles being mounted at right angles to each other and concentrically in the same focusing reflector;

Fig. 5 illustrates how the transmitting and receiving apparatus may be mounted between the telescope and the horizontal vernier of a surveyor's transit;

Fig. 6 shows another D. C. amplifier similar to the one shown in Fig. 1 but employing push-and-pull amplification; and Fig. 7 discloses the electronic measuring apparatus applied to directional flying bomb control.

*Fig. 1 structure.*—Referring to Fig. 1 of the drawings the block diagram 10 represents an oscillator of the electronic type well known in the art which generates an ultra-high radio frequency of from, say, 100 megacycles to 3000 megacycles (three meter to one-tenth meter wave length and for airplane altitude indication a still longer wave length) depending on the accuracy of measurements desired. If measurement readings to within less than a centimeter are desired the higher of the two frequencies is probably preferable. This frequency is for convenience designated F1. To render this oscillator capable of generating a very stable and precise frequency the piezo crystal 9 is preferably employed.

This radio energy of frequency F1 generated by oscillator 10 is applied to the di-pole of a directional transmitting antenna TA, which emits directional radio wave energy or space energy through an angle of considerable spread of say 5 to 30 degrees which energy upon striking the reflector RE is reflected back, conveniently called an echo, to the receiving antenna RA located adjacent the transmitting antenna. This reflector is preferably, as shown, composed of three plane reflecting surfaces all at right angles to each other. As long as the reflector is stationary, the two antennas TA and RA are assumed to be stationary, the frequency of the energy received by the receiving antenna RA is the same as the frequency of the energy transmitted. If, however, the reflector RE is moved the difference between the cycles transmitted and the cycles received is the same as the difference between the number of cycles in transit before and after such movement of the reflector took place. This is known as the Doppler phase shift. The manner in which this phase shift will be measured and integrated by the Fig. 1 structure will now be pointed out.

The radio energy received by antenna RA, which is preferably also of directional construction and has a di-pole in the focus thereof, and which is activated by frequency F1 plus or minus the Doppler shift depending upon whether the reflector RE is moved toward or away from the antennas TA and RA, is preferably amplified by a tuned receiver-amplifier 15 and including volume control features well known in the art. This received radio frequency energy is of the same frequency as the transmitted frequency F1 so long as the reflector RE, or other retransmitting medium, remains stationary with respect to the antennas TA and RA. As the distance from antennas TA and RA to the reflector RE increases the number of cycles received by antenna RA is reduced to an extent equal to twice the distance in wave length of frequency F1 of the distance the reflector RE has moved whereas if this distance is decreased the number of cycles received is increased do that extent. Stating this still more specifically if the reflector is moved out farther a distance of one meter, assuming that frequency F1 is 299,820,000 cycles per second (one meter wave length), then the number of cycles received is two less than the number of cycles transmitted. Also, if reflector RE is brought closer at a speed of one meter per second then the received frequency is 299,820,002 cycles per second instead of 299,820,000.

This received amplified radio frequency energy is then applied to the primary windings 11, 12, 13 and 14 of transformers Tr1, Tr2, Tr3 and Tr4, as is evident from the circuit passing through these windings in series. Radio energy is also applied directly from the oscillator 10 to the primary windings 21 and 23 of transformers Tr1 and Tr3, but its application of this energy to the winding 23 of the transformer Tr3 is in the reverse polar direction, as is evident from the circuit passing through these windings. Radio frequency current is also conducted from the lag unit 25, fed from oscillator 10, which produces current preferably lagging in phase substantially 90 degrees behind the phase of the current generated by oscillator 10, to the primary windings 22 and 24 of transformers Tr2 and Tr4. It should, however, be noted that the polarity connections to winding 24 of transformer Tr4 are reversed as compared with the connections to winding 22 of transformer Tr2.

From this construction, it can be readily seen that if the current supplied from phase lag unit 25 lags as it should substantially 90 electrical degrees behind the current supplied directly from the oscillator 10 that the cumulative alternating magnetisms in the two windings of these air core transformers build up in the particular order Tr1, Tr2, Tr3 and Tr4 when the measured distance increases, namely, when the received frequency is less than the generated frequency. That is, if a current of slightly different frequency is supplied to the primary windings 11, 12, 13 and 14 than to windings 21, 22, 23 and 24, as may be due to a varying Doppler phase shift due to the movement of the reflector RE along the line to be measured, the voltages induced in the secondary windings of these transformers will become maximum at Doppler frequency in the order 31, 32, 33 and 34 if the frequency applied from unit 15 is lower, and that these maximums will occur in the reverse order namely in the order 34, 33, 32 and 31 if the frequency of the current supplied from unit 15 is higher.

The apparatus thus far described is capable of producing four distinctive high frequency alternating currents amplitude modulated at an extremely low frequency, namely, the Doppler frequency. These modulations reach their maximums in quadrature, that is, ninety electrical degrees apart and the frequency of these modulations is equal to the Doppler frequency due to movement of the reflector RE toward or away from the antennas TA and RA. The apparatus presently to be described constitutes means to cause a shaft to rotate in synchronism with this Doppler frequency and in one direction if the out-put amplitude maximums from transformers occur in the order Tr1, Tr2, Tr3, and Tr4 and rotate in the opposite direction if the amplitude maximums occur in the order Tr4, Tr3, Tr2, and Tr1. The antennas TA and RA are preferably isolated from each other by a shield 35. The high frequency alternating currents are then rectified (detected) by rectifiers R1, R2, R3 and R4. The direct currents delivered by these rectifiers, which vary in accordance with the Doppler shift and frequency, are then by suitable D. C. amplifiers, such as A1 (Fig. 1), AD (Fig. 4) or A5 (Fig. 6). In the Fig. 1 and Fig. 6 structures the direct current is repeatedly pole changed by commutators. The commutator 41—44 for amplifier A1, delivers its alternating current output to a transformer Tr5 and this transformer has its secondary winding connected to control grid G of amplifier tube T1. The plate circuits of these tubes for amplifiers A1, A2, A3 and A4 are included in series with the primary windings of transformers Tr6, Tr7, Tr8 and Tr9, respectively. Each of these tubes, such as tube T1, includes the usual cathode Ca, grid G, and plate P and includes a plate source for convenience illustrated as a battery BP and a filament source B. These tubes have their grids either free or so biased that alternating current will be superimposed on their normal direct plate current so that the alternating current in the secondary windings of the plate circuit transformers is proportional to but many times greater than that of the current in the input circuits to these tubes. Each of the D. C. amplifiers A2, A3, and A4 are of identical construction to that of amplifier A1 and have for convenience been shown in block form.

The amplifiers A1, A2, A3 and A4 include rectifiers R5, R6, R7 and R8 respectively, the direct current out-puts of which vary with the direct current in-put to the commutators. These out-put currents are applied to the windings W1A—W1B, W2A—W2B, W3A—W3B and W4A—W4B, respectively, of a synchronous motor SM including a permanent magnet rotor N—S. Obviously, an electro-magnet rotor may be used instead of this permanent magnet rotor. It may be pointed out here that the two coils of each pair of windings, such as W1A and W1B of pair W1A—W1B are so wound that current flowing through the pair tends to produce magnetic flux in the same direction through the rotor that is the pole containing windings W1A and W3B becomes a north pole whereas the pole containing windings W1B and W3A becomes a south pole if the rectifier R5 only were to deliver current to the motor. It is readily understood from the manner in which transformers Tr1, Tr2, Tr3 and Tr4 are connected up that when the rectifier R5 delivers a maximum amount of current the rectifier R7 will deliver zero current (assuming good volume control) and the other two rectifiers R6 and R8 will deliver equal amounts of currents. These latter currents from rectifiers R6 and R8 will of course neutralize each other since they flow in bucking relationship about their associated poles. It is thus seen that the current out-put from rectifiers R5, R6, R7 and R8 become a maximum in the order given, and that north poles will be created in the stator of the synchronous motor in the order W1A—W3B, W2A—W4B, W3A—W1B and W4A—W2B. It should be remembered that the D. C. out-put from rectifiers R5, R6, R7 and R8 vary in synchronism with the high frequency out-put from transformers Tr1, Tr2, Tr3 and Tr4 respectively. In this connection it is desired to point out that the stator of the synchronous motor is preferably of the toothed ring construction and the windings are preferably either of the lapped or pan-cake distributed type. This construction is resorted to so that the rotor N—S will very accurately assume an angular position corresponding to the rotated position of the stator magnetic field and to the phase relationship of the currents applied to the stator.

Each of the commutators 41—44, one for each amplifier, comprises two slip rings 41 and 42 which are connected to the output of the associated rectifier through suitable brushes and each slip ring is directly connected to one segment of a two segment commutator including segments 43 and 44. The condenser 46 is used to round out the waves of the low frequency current generated by the commutator. All of these commutators are contained on a shaft 45 driven by a motor M. The out-put of each of the commutators 43—44, through suitable brushes shown by arrows is fed to the primary winding of a transformer, such as, transformer Tr5, the secondary winding of which is connected across the cathode and grid of the amplifier triode T1. Each of the four triodes T1 are, therefore, actuated, by alternating current of the same frequency as determined by shaft 45 but the out-put of these triodes are modulated, at least at times, to the Doppler frequency but with the phase relationship of these modulations displaced successively substantially 90 degrees with respect to each other. That is, the out-put from the transformer Tr7 is a maximum when the out-put from the transformer Tr9 is zero and vice versa. In this connection it may be pointed out that the lag unit 25 produces a lag of substantially 90° (electrical degrees) in current of frequency F1 so that when the currents in windings 11 and 21 of transformer Tr1 are in exact phase the currents in windings 12 and 22 of transformer Tr2 lag 90° one behind the other so that their sum is of medium magnitude, and the currents in windings 13 and 23 of transformer Tr3 are in phase opposition so that their sum is zero. Since the currents in wires including windings 12 and 22 are at times, namely when the reflector RE is being moved, of different frequencies the modulation of the out-put from the transformers Tr1, Tr2, Tr3 and Tr4 have a frequency which is the same as the beat frequency of the transmitted and received radio frequency. This is called the Doppler frequency.

The rotor N—S is contained on a shaft 50 suitably supported in bearings (not shown) on which is contained an indicating hand TI. This shaft also contains a pinion 51, which is in meshed relationship with a gear 53. Gear 49 drives idler gear 52 and this gear drives pinion 54 and indicating hand UI. Similarly, but in reverse order the idler 53 drives gear 55 and hundreds indicator HI. Thousand and ten thousand digit indicators THI and TTHI respectively have also been provided and are driven by similar gears. In practice the gear ratio between these indicators is such (ten to one) that indicator UI rotates ten times as fast as does indicator TI, indicator HI rotates one tenth as fast as indicator TI and indicators THI and TTHI are driven by similar gear reductions. It is thus readily seen that if the frequency of the current generated by oscillator 10 is 150 mc. (two meter wave length) each revolution of indicator TI will signify one meter of change in distance to the reflector RE, each revolution of indicator UI will signify 10 cm. (centimeters) so that the numerals associated therewith signify centimeters.

The lowest speed indicator, which as illustrated is indicator TTHI, is through a shaft 60 connected to a rheostat arm 61, which arm wipes over a circularly arranged resistance unit 62 preferably of non-inductive resistance. This rheostat (mechanical volume control) comprises part of the receiver 15 and is used for the purpose of increasing the amplifying factor or volume out-put of the receiver 15 over what it otherwise would be, as the reflector RE is moved farther away and reflects less energy.

The apparatus disclosed in Fig. 1, therefore, converts extremely high frequency current, only slightly different in frequency, into modulated direct currents which are modulated in accordance with the difference in frequency of these high frequency currents and which are phase displaced and useful in creating a rotating magnetic field.

*Fig. 2 modification.*—Instead of using a D. C. amplifier, such as the amplifier A1 (shown in Fig. 1) as D. C. amplifier such as the amplifier AD shown in Fig. 2 may be employed. This D. C. amplifier is commercially known as an amplidine and constitutes a two-stage direct current generator. Its stator ST is of the usual construction including a shunt field winding 63 and series field winding 64. The rotor is of the usual direct current armature type except that its usual output brushes 65 and 66 are short-circuited and an additional pair of brushes 67 and 68, included in the out-put circuit including series field winding 64, are provided. The short circuited brushes produce a heavy cross magnetization and this crossfield as it is cut by the armature conductors during rotation of the armature causes a larger voltage to be produced at auxiliary brushes 67 and 68. A direct current amplifier such as shown in Fig. 2 may produce some voltage due to residual magnetism in the stator ST for which reason high quality soft iron only is used in the stator. A small amount of voltage due to residual magnetism is, however, not very harmful because the bucking relationships of the windings of synchronous motor SM neutralizes the effect to a partial extent.

In practice, all of the apparatus shown in Fig. 1 except the antennas TA and RA and the reflector RE are preferably mounted in a casing 70 supported by a tripod 71 as shown in Fig. 5 of the drawings. This tripod not only supports the casing 70 and its contents but also supports the essential elements of a surveyor's transit. The horizontal angle reading vernier calibrated scales 80—81 are preferably located between the tripod 71 and casing 70; whereas, a verticle angle reading vernier calibrated scales 72—73 are preferably located on the casing 70, supporting fluid contained levels 74, and supports a cross-hair provided telescope 75 in which the cross-hairs are in focus. Not only does the telescope enable the surveyor to direct his antennas TA—RA along the line to be measured, but it enables him to read the angle of slope with respect to horizontal as is determined by level 74, or the angle between two different lines to be measured may also be read.

In the foregoing discussion it was assumed that the two antennas TA and RA be supported in two different focused reflectors as shown in Fig. 1. This would bring in a slight error especially if a line beginning very near the transit were to be measured instead of a line starting say five meters away from the transit were to be measured, this error being due to the fact that the two sides of an acute triangle would be measured instead of two coincident lines. To avoid such error and to enable an increased amount of radio energy to be received at the receiving antenna it is proposed to employ a re-transmitter RT (Fig. 4) which not only returns radio energy polarized in a different plane, but also amplifies the returned radio energy, and to further use a polarized transmitting antenna and a polarized receiving antenna associated with the transit unit. Such a structure has been shown in Fig. 4.

*Fig. 4 structure.*—In the Fig. 4 structure the fixed radio transmitting antenna di-pole TA4 and the receiving di-pole RA4 are concentrically arranged at right angles to each other in the same focused radio reflector 200. In the same manner the portable radio reflector 201 is provided with a receiving di-pole antenna RA5 disposed vertically and a horizontally disposed dipole transmitting antenna TA5 which are also supported concentrically. In other words, radio energy polarized in one plane may be transmitted from di-pole TA4 to di-pole RA5 and then this received energy may be amplified by an amplifier tube T5 presently to be described and may then be transmitted back polarized in a plane at right angles to the first mentioned plane of polarization. This structure enables the transmitting di-pole TA4 and the receiving di-pole RA5 to be concentrically mounted, as shown, so transmission out and back may take place over the same line, a portion or all of which is, to be measured. The receiving di-pole RA5 is connected across the grid G and cathode Ca of the tube T5 through a circuit including the tuned unit consisting of a condenser 78 and an inductance 79 connected in multiple, and the grid bias battery 80 in series. The plate circuit includes a plate battery Pb5 and the primary winding of a transformer Tr12 in series. The secondary winding of this transformer Tr12 is resonated to the frequency retransmitted by a condenser 82 and is connected across the di-pole TA5. The tuned unit 78—79 is tuned to this same frequency.

*Fig. 6 modification.*—In Fig. 6 has been illustrated a modified form of D. C. amplifier. In this form of amplifier a semi-circular commutator segment 210 is continuously connected to one terminal of the direct current source, usually a pulsating current source, the other terminal of which is connected in series with inductance or choke coil 212 and then to the mid-point of inductance 215. This inductance 215 has connected in multiple therewith a condenser 218. The midpoint of this inductance 215 is also connected to the cathodes Ca of amplifiers T6 and T7, the ends of the inductance 215 being connected to the grids g of tubes T6 and T7. The plate battery Bp6 is common to both tubes T6 and T7 and is connected between the two cathodes Ca of tubes T6 and T7 and the mid-point of the primary winding 220 of transformer Tr14, the ends of this winding 220 being connected to the plates P of these tubes. The secondary winding 221 of this transformer Tr14 is connected to the input leads of a full-wave rectifier R10. From this construction it is readily seen that rotation of commutator 210 will cause such direct current as is present at the input leads to be alternately applied to opposite ends of the inductance 215. The condenser 218 in combination with choke coil 212 cause the more or less square waves to be rounded out into more-or-less sine waves of alternating current. This alternating current is then amplified by amplifiers T6 and T7. The direct current components of the plate circuit current are removed by transformer Tr14, the alternating current is then rectified by rectifier R10 from whence it is applied to one of the windings of the synchronous motor SM of Fig. 1. This construction produces very accurate amplification in spite of direct current components due to the fact that the direct current components in the amplifying circuits are excluded from the ultimate out-put circuit.

*Operation Fig. 1.*—Let us assume a surveyor has a starting bench-mark on the ground and that he wishes to measure a predetermined distance in a particular direction. He will set up the tripod of the transit shown in Fig. 5 directly over this bench-mark by the use of a plumb-bob in the usual way. He will then sight upon the point to which he is to measure, possibly a mile away, by the use of the telescope 75 of the transit structure. He will then measure, as by the use of a tape measure, a distance of say 10 meters forward from the bench-mark at which point the reflector RE, or the retransmitter RT (Fig. 4) will be temporarily placed. A reading will now be taken on the dials TTHI, THI, HI, TI and UI or, and preferably, these dials will be set to indicate 10 meters. The surveyor will then turn on the current on his electronic apparatus and the surveyor's helper will strap the reflector (Fig. 1) or the regenerator (Fig. 4) on his back and walk, ride or row toward the point to which accurate measurement is to be made. It is not necessary that he walk in a straight line nor that he walk continuously forward in that a backward step will do no harm. During this walking of the helper the indicators on the dial will rotate in accordance with every change, either longer or shorter, in the distance between the tripod and the surveyor's helper.

This rotation of the hands on the indicating dials (Fig. 1) may be explained as will presently follow. When the set is turned on with the reflector RE at a point 10 meters forward of the bench-mark radio frequency current of ultra-high frequency will flow phase displaced in primary windings 21, 22, 23 and 24 of transformers Tr1, Tr2, Tr3, and Tr4, respectively, but since these currents are all of exactly the same frequency and quantity whatever direct current will flow from rectifiers R5, R6, R7 and R8 will be constant and of the same value for each rectifier and no rotation of armature N—S will take place. There will, in fact, be no magnetism acting on the rotor N—S due to currents derived from windings 21, 22, 23 and 24 alone because the stator windings of the synchronous motor SM all buck each other. An instant (less than a micro-second) later alternating current of exactly the same ultra-high frequency, derived directly from receiver-amplifier 15 will also flow in primary windings 11, 12, 13 and 14 of these transformers, by reason of energy reflected back from the reflector RE. These latter currents will be all in phase and flow in the same direction through the windings. This will change the current delivered by some of these rectifiers R5, R6, R7 and R8 which may cause slight turning of the rotor N—S to line up this rotor with the prevailing winding. It is, therefore, best to set the dials to 10 meters after energy is turned on and before the helper starts to move away with the radio reflector and we will assume this is done. If the radio energy is of exactly 2 meter wave length then there will be a loss of one cycle in the cycles received by radio receiver 15 and supplied to primary windings 21, 22, 23 and 24 as compared with the cycles supplied to primary windings 11, 12, 13 and 14 of transformers Tr1, Tr2, Tr3, and Tr4 for every meter of increase in the distance between the sending-receiving equipment and the reflector RE. This will cause the currents in windings 11—21, 12—22, 13—23 and 14—24 to become successively in phase and will cause the secondary windings 31, 32, 33 and 34 to successively deliver a maximum amount of energy simultaneously with a minimum delivery of energy from windings 33, 34, 31 and 32 respectively. That is, winding 31 delivers maximum energy when winding 33 delivers minimum or zero energy. In this connection, it should be understood that the electronic volume control feature of receiver 15 will, to a large extent, maintain the out-put of receiver 15 constant and this control will be supplemented by control performed by the mechanically actuated volume control mechanism including rheostat C2 (Fig. 1). These energies after being rectified by rectifiers R1, R2, R3 and R4 will be transmitted in the form of low frequency A. C. energies by commutators 43—44 one for each amplifier A1, A2, A3 and A4 to transformers such as Tr5 of amplifier A1, for instance. These alternating currents of low frequency in quantities commensurate with the energies delivered by their companion transformers, such as transformer Tr1. The net result is that the amplifier tubes of units A1, A2, A3 and A4 will successively deliver maximum energies in their plate circuit transformers Tr6, Tr7, Tr8 and Tr9, resulting in rectifiers R5, R6, R7 and R8 successively delivering their maximum energies, so that coils W1A—W1B, W2A—W2B, W3A—W3B and W4A—W4B will be successively energized to their maximum direct current value and will successively attract a particular pole of the rotor N—S successively and repel the other. The two windings on each pole of this motor are wound to buck each other so that if both are energized to the same extent zero magneto-motive force will be induced therein. The rotor N—S will, therefore, make one complete clockwise revolution for each meter advance of the surveyor's helper assuming that one meter wave length frequency energy is transmitted. The indicating hand TI will, therefore, rotate one revolution and the hand UI will rotate 10 revolutions for each meter advance of the surveyor's helper. The hand UI, therefore, indicates centimeters, the hand TI indicates decimeters (one meter per revolution), the hand HI will indicate 10 meters for each revolution, the dial THI will indicate 100 meters for each revolution and the dial TTHI will indicate 1000 meters for each revolution. Additional indicating dials may obviously be added and the volume control rheostat 62 will be directly driven by the slowest indicating dial. It should be understood that when a particular winding on synchronous motor SM has its direct current at a maximum value the associated winding has zero current flowing therein and the other two windings are energized substantially to the same extent and are bucking each other so that a reliable rotating field will result.

When the surveyor's helper reaches his destination, whether that be a definite point or a definite distance, he will stop either because he has reached such spot or because the surveyor has told him, as by walkie-talkie radio, where he shall set his reflector RE. The helper will now set the mono-pod 16 (Fig. 4) to the right or left forward or backward as instructed by the surveyor to cause a new point to be located. This information is determined by a cross-hair in the telescope 75 and by readings on his dials UI, etc. If the distance to a marker point is to be measured the surveyor will merely read the dials UI etc. at a time when the reflector is accurately balanced on the stake or bench-mark or other place of reference. This reading will give the correct distance if the meter was set at 10 meters when the helper started from the 10 meter point.

If the amplifiers illustrated in Figs. 2 or 6 were substituted for the amplifiers A1—A4 the apparatus would function in exactly the same manner as just described. Also, if the reradiating transmitter RT of (Fig. 4) were substituted for the reflector RE the apparatus of Fig. 1, for obvious reasons, would function exactly the same assuming antenna 200 is substituted for antennas TA and RA. In this connection it may be pointed out that reflector RE constitutes three planes of radio reflecting (conducting) material arranged at right angles to each other so that substantially all the radio energy that strikes it will be reflected back in the direction from which it came.

*Fig. 3 structure.*—In this form of applicant's invention an ultra-high frequency F1 is generated by the oscillator 100 through the medium of electronic tubes, not shown, and the piezo crystal 99. Since in this form of the invention it is proposed to use a suitable frequency-differential motor, such as are well known in the art, to drive the distance indicating dials, shown only in Fig. 1 it is necessary to obtain two alternating currents of rather low frequency which have a small frequency differential small enough so that the beat frequency when they are combined in a mixer this beat frequency is low enough to be applied to an iron core motor. That is, it is necessary to obtain a second current which differs from a first current of rather low frequency to an extent (doppler frequency) depending on the rate at which cycles are lost or gained in change of the distance from transmitting antenna TA3 to reflector RE3 and back to receiving antenna RA3. The sum total difference in the cycles of the two frequencies is known as the Doppler phase shift, which may be many cycles of shift or may be a single cycle shift, which will result in one revolution of such frequency differential motor. When the rate of change is more or less continuous, it is called Doppler frequency. By frequency-differential motor is meant a motor that operates at the synchronous speed of the beat frequency of two different frequency energies applied to the stator and rotor respectively of such motor. Such a motor SEM has been illustrated in Fig. 3 of the drawings.

To obtain such currents of low frequency a second oscillator 101 to generate a high frequency current differing to a small fraction of one per cent from the frequency F1 is shown provided. This oscillator includes a reactance tube Ta having its plate circuit included in series with the plate circuit of an oscillator tube Ts which tubes, in combination, generate an ultra-high frequency F2 which is lower than the frequency F1 by, say, about 500 cycles per second. This reactance tube is capable of producing phase shift dependent on the potential applied to its control grid g. Since it is difficult to hold the two frequencies F1 and F2, which are ultra-high frequencies, only about 500 cycles per second apart, it is proposed to employ a discriminator including a double diode rectifier tube Td which will generate a net D. C. voltage dependent on the difference between the frequencies F1 and F2. This net D. C. voltage is then applied to the control grid g of the reactance tube Ta, to in turn control, i. e. change when necessary, the frequency generated by oscillator 101 so as to maintain it about 500 cycles per second below the frequency F1.

The discriminator (Fig. 3) is supplied with energy of frequency F1 minus F2 (or F2 minus F1 if F2 is the greater) derived from the mixer 104 fed by radio frequency currents derived from oscillators 100 and 101. The out-put of this mixer 104 is then amplified as by an amplifier 105, and applied to the primary winding of transformer Tr10. The secondary winding of this transformer is connected to two tuned units 106—107 and 108—109 connected in series with their junction grounded through a condenser 111 employed to drain off any high frequency charges that might otherwise have detrimental effect. The secondary winding of transformer Tr10 is also connected to the double diode rectifier Td so as to alternately feed plus energy to the two anodes thereof which energy will be rectified by this double diode Td and applied to opposite ends of a resistance unit 115. The midpoint of this unit 115 is connected to the junction between tuned units 106—107 and 108—109 by a wire 102. It may be pointed out that these tuned units 106—107 and 108—109 each comprise a condenser and inductance in multiple and are respectively tuned to frequencies a little above and a little below the desired mixer frequency of 500 c. p. s. From this construction, if the mixer frequency is slightly above 500 c. p. s. one half of the double diode will rectify more current than the other half and if the mixer frequency is slightly below 500 c. p. s. the other half of the double diode will rectify more current than said one half. The net result is that a net D. C. potential proportional to the difference between these energies will appear on wire 116 with respect to ground. This D. C. potential is conducted as by wire 116 to the grid of the reactance tube Ta to in turn change the frequency generated by oscillator 101 to a value to cause the mixer frequency to more closely approach the desired frequency of 500 c. p. s.

A second mixer 120 is provided which has fed thereinto the radio frequency energy F2 and the radio frequency energy reflected back from reflector RE (F1±Doppler), detected by receiving antenna RA3 and then selected and amplified by the receiver and amplifier 121. The alternating currents delivered by the two mixers 104 and 120 for obvious reasons differ from each other in frequency or in phase shift, as the case may be, to the extent of Doppler frequency or phase shift, depending on whether the distance to the reflector RE is varied at a fixed rate or just moved slightly, respectively. These alternating currents are then passed through filters 124 and 125 which are both constructed to pass currents of approximately 500 c. p. s. to filter out currents of frequencies above 500 and below 400 cycles per second. The out-put of the filter 124 is then phased out into a leading phase circuit and a lagging phase circuit including condenser 126 and an inductance 127, respectively, in such manner that the currents flowing in the two windings 128 and 129 of the stator of the motor SEM are displaced in phase substantially 90 degrees. The out-put leads of the other filter 125 are connected directly to rotor winding of the motor SEM. It is readily understood, from this construction, that the frequency-differential motor SEM will operate at a speed depending on the difference between the frequencies applied to the rotor and stator respectively, and since this frequency or phase shift is the Doppler frequency or phase shift the shaft of the motor SEM may be used to indicate the Doppler cycles that are in transit between the transmitting-receiving unit TA3—RA3 and the reflector apparatus RE3.

A detailed discussion of the oscillator 101 and its associated reactance tube Ta is not believed necessary in that this structure is well known in the art and is illustrated and described on pages 279–281 of "Ultra-High Frequency Techniques" by Brainard, Koehler, Reich and Woodruff. It may, however, be stated that although it has been pointed out in considerable detail how automatic frequency-difference control means may be provided, it should be understood that this feature of applicant's invention may be omitted in those cases where sufficiently constant frequency may be generated by the usual piezo crystal control method. Or, if desired, adjustable oscillator frequency control means may be provided in this second oscillator 101 which may be manually adjusted, since variation of this second frequency does not effect the system's accuracy, unless it fluctuates both above and below the frequency generated by oscillator 100 in which case skipping of operation would result. In this connection, it is proposed to keep the frequency generated by the oscillator 100 substantially constant and if the oscillator 101 is likewise kept substantially constant the difference frequency or modulation frequency should not fluctuate more than say 50 per cent. In this connection it should be understood that such fluctuation of the frequency applied to the motor SEM does not change its speed in that it operates at a speed depending upon the difference between two transmitted and received frequencies which difference is the Doppler frequency. Also, if the same frequency in cycles per second is subtracted from two different frequencies the resultant frequencies differ from each other by the same number of cycles as the original frequencies.

It should also be understood that the ultra-high frequencies proposed to be used are considerably above 100 mc. (megacycles) and therefore radio circuits of usual construction, such as illustrated, are not applicable and it should be understood that the circuits and apparatus shown are merely conventional and are intended to represent apparatus useable with either frequencies above or below 100 mc.

*Operation Fig. 3.*—The modified form of apparatus illustrated in Fig. 3 is used in exactly the same manner as the apparatus illustrated in Fig. 1 for which reason it is deemed unnecessary to discuss the various steps taken during its use. The functioning of the apparatus itself will, however, now be described.

The oscillator 100 through the medium of suitable electron tubes (not shown) interconnected with an oscillatory crystal 99 known as a piezo crystal generates an ultra-high radio frequency current of say 150 megacycles or two meter wave length. This ultra-high frequency energy is fed to the mixer 104 which mixer is also supplied with radio frequency energy generated by the oscillator 101. This latter oscillator is, however, preferably not provided with a piezo crystal but is preferably an oscillator of a controllable type, also including oscillatory electron tubes which oscillator inherently oscillates to generate a frequency about 500 cycles per second less than does the oscillator 100 and in addition is provided with a direct current frequency changing control circuit including wire 116 and already described.

The mixer 104 delivers through means conventionally shown as a wire 130 currents of frequencies of both the sum and the difference of the frequencies generated by modulators 100 and 101 to the filter 124. This filter 124, however, allows only the lower one of these frequencies to pass and this lower frequency which may vary say between 400 and 600 cycles per second is amplified by amplifier 105 and then applied to transformer Tr10 as through a wire 131. The sum of the two frequencies is such a high frequency that the filter 124 will reject it in its entirety. This transformer Tr10 has its secondary winding connected across a discriminator unit including two tuned units 106—107 and 108—109 in series and also to the two plates of a double diode rectifier. One of these units is tuned to resonate at a frequency higher than 500 cycles per second and the other is tuned to resonate at a frequency lower than 500 cycles per second. The alternating current potential supplied to these units in series, therefore, divides itself between the units dependent on the frequency supplied thereto. The unit 106—107 is connected through the upper rectifying unit of the double diode rectifier $Td$ across the upper half of the resistance unit 115; whereas, the tuned unit 108—109 is connected through the medium of the lower rectifying unit of this double diode $Td$ to the lower half of this resistance unit 115. It is readily seen from this construction that the net voltage across the resistance unit 115 is proportional to the difference in the out-put of the two rectifying portions of the double diode $Td$ and is equal to the difference between the voltage drops across the two halves of this resistance unit 115. Since the input voltages to these rectifying portions are frequency dependent by reason of the tuned units 106—107 and 108—109 it will be seen that the direct current potential applied to the control grid $g$ of the reactance tube $Ta$ of the oscillator 101 will vary in value and polarity with the frequency generated by oscillator 101, the frequency of the current generated by the other oscillator 100 being substantially constant. Therefore, this apparatus may be and is actually used to control the frequency generated by oscillator 101 to an extent that the mixer out-put frequency of the mixer 124 is maintained between, say, 400 and 600 cycles per second although either a higher or a lower beat frequency may be used.

The oscillator 100 also supplies ultra-high radio frequency energy to its associated transmitting antenna TA3 which in turn transmits radiant energy to the reflector RE3, which is of the same construction as reflector RE. This radiant energy is then reflected back to the receiving antenna RA3 constituting part of the surveyor's unit. As already pointed out so long as the reflector RE3, or the reradiator of Fig. 4, is stationary the returned radio energy maintains its original frequency and phase relationship and remains the same as that of the radio energy generated by oscillator 100. If, however, the distance between antennas TA3—RA3 and reflector RE3 is changed a Doppler phase shift takes place between the transmitted and received radio energy, and it is this phase shift which may comprise from less than one to thousands of cycles that is measured to indicate the extent of movement of the reflector from its starting point.

If we for a moment assume that the wave length of frequency F1 is 2 meters and the receiver is moved away at the rate of 1 meter per second we then have three different kinds of frequencies to contend with at the input to mixers 104 and 120. Frequencies F1 and F2 (where F1 minus F2 is approximately 500) are fed into mixer 104 and frequencies F2 and F1 minus 1 are fed into mixer 120. If we for a moment assume the out-put frequency of mixer 104 to be 500 cycles per second (F1=150,000,000 and F2=149,999,500) then the out-put frequency of mixer 120 is 499 cycles per second. The motor SEM is of the two-phase stator and wound-rotor type which may for convenience be called a frequency differential motor. It is, of course, understood that if the stator of this motor has its windings energized by 500 cycles per second two phase energy (the two phase currents being obtained by inductance 127 and condenser 126) and the winding of rotor 130 is energized by 499 cycles per second current that the magnetic field produced by these windings will lock in and that the rotor will rotate at the frequency-difference speed of 1 R. P. S. and its shaft will manifest a speed of one meter per second which is the speed of movement of the reflector RE3 away from the unit TA3—RA3. If frequency F2 should rise 50 C. P. S. the frequencies delivered to the motor SEM would be 450 and 449 and the speed of this motor would remain the same. Similarly to this uniform speed of movement by the recording apparatus this apparatus will, for obvious reasons, indicate and record definite irregular forward or backward movements of the reflector RE3 along the straight path of the radio beam. Obviously, the retransmitting apparatus illustrated in Fig. 4 may be substituted for the reflector RE3 and the operating results will be the same.

The apparatus illustrated in Fig. 3, therefore, functions to obtain the same results as are performed by the Fig. 1 structure even though the type of dial driving motor is quite different, a differential type motor being used in Fig. 3 and a synchronous motor of a four phase direct current type being used in the Fig. 1 structure.

The combined transit and electronic structure shown in Fig. 5 may also be used to simultaneously measure the four sides of a rectangular plot by turning the receiving antenna RA at right angles to the axis of the transmitting antenna TA and by using three retransmitters (Fig. 4) each with its antennas mounted at right angles to each other. Three surveyor's helpers, one for each retransmitter, will then start walking from the three corners of a small measured-off square, the transmitter-receiver unit being on the fourth corner, to the three corresponding corners respectively of the rectangular plot to be measured, the transmitter-receiver unit being positioned on the fourth. When these helpers have reached their respective corners they will set their retransmitters on the respective corner markings and the surveyor will then read the dials. If these dials indicated zero when these helpers started out, as is assumed, the correct perimeter distance of the rectangular plot is equal to the reading taken plus the perimeter distance of the original square. This is a true measurement because the radio beam is transmitted from the transit to the first reflector, then from the first reflector to the second reflector, then from the second reflector to the third reflector and then from the third reflector to the receiving antenna of the transit and the apparatus in the transit measures the total number of cycles and fraction thereof of the entire beam extending from the transmitting antenna around the rectangular plot to the receiving antenna of the transit.

The apparatus is particularly useful in measuring great distances across gullies, lakes or rivers in that the reflector or reradiator may be taken over crooked paths across such gulley, lake or river without incurring an error in the measurement of the final straight line distance.

Also, if desired, especially for measuring distances through woodlands or tunnels the radio beams may be replaced by light beams of like frequency interruption in which case light sensitive receivers are used and in which case a light reflector or light reradiator is substituted for the radio reflector or retransmitter.

Since the present invention functions on the basis that an increase in separation between a reflector and a transmitting-and-receiving unit of which originally the dials indicate zero does the measuring, this and since separation must start with zero renders this apparatus just as useful if this unit is moved away from such reflector as when the reflector is moved away from the unit. Also, the earth's surface is a fairly good reflector. These characteristics may be taken advantage of in measuring an airplane's absolute altitude for in this case the radio transmitting-and-receiving unit may be mounted on the airplane with its antennas directed downwardly and the earth's surface may be used as the reflector, in that an airplane always starts its flight from the earth's surface. In this case, however, a much lower frequency radio energy may be desirable in that sudden changes in the contour of the earth's surface sometimes exist, and these changes must be recorded accurately to maintain accurate reading of the distance from the airplane to the earth, and also because the absolute altitude of an airplane need not be read to the centimeter. Another reason for using a lower frequency is because of the large part of the earth's surface which will serve as a reflector at the same instant, even when a directed beam is used. A jumbled-up reflection may result when short wave energy is used, and this might result in a net zero of reflected energy. It should be understood that the term "radio retransmitting medium" or "retransmitting means" may comprise a reflector such as shown in Figs. 1 and 3, a retransmitter such as shown in Fig. 4 or the earth's surface.

The electronic measuring apparatus described also lends itself for the remote control, particularly steering, of a vehicle such as a boat, an airplane or a robot flying bomb. Such remote control steering preferably requires two of the sending-receiving units (Fig. 1 or Fig. 3) on an airplane or flying bomb which are designed to function on different frequencies, one frequency may for instance be three-fourths that of the other, and with the two transmitting antennas concentrically located and their receiving antennas concentrically located and both directed rearwardly. Two retransmitting units, such as shown in Fig. 4, are preferably located on the ground and just to the rear and equal distances to the right and left respectively of the antennas on the robot preferably so that both retransmitters are the same distance from the robot carried antennas when the robot is still at rest. The energy on both sets is then turned on. The indicator motor 300 of the higher frequency set and which is tuned to the frequency of the retransmitting set located to left and rear drives the shaft 301 through gears 302 and 303 at the same speed as the motor 310 of the lower frequency set drives the shaft 311, but in opposite direction, when the radio transmitting distance for the two sets are increased at the same rate. The gear 302 is preferably three-fourths as large as gear 303 and the frequency of the left rear beam acting on motor 300 is preferably four-thirds of the frequency acting on motor 310. This is true because if the distances are increased at the same rate the motor 310 will turn three-fourths as fast as motor 300 but by reason of the speed reduction effected by gears 302 and 303 the shafts 301 and 311 will operate at the same speed in opposite directions so that the two bevel gears 304 and 314 will turn the bevel pinions 315 and 316 idly about their bearing pins 317 and 318 and without rotating the spider 320 supporting the rudder 321, and also supporting these bearing pins. If the speed of bevel gear 314 is now slightly increased over the speed of bevel gear 304 because the low frequency beam length is increased faster than the other the spider 320 is slowly turned counter clockwise as viewed from the top of the drawing to cause the robot or airplane to steer toward the right (as viewed from the top) to make the rear right and low frequency beam relatively shorter. From this consideration it is obvious that the motor 310 is controlled by the rear right and low frequency beam. It is thus seen that each time the robot or other vehicle gets slightly off its course the rudder is quickly shifted to make the necessary correction to make the two beams again of the same length. Obviously, a flying bomb can be accurately directed by this apparatus. Also, since the beams originate on the flying bomb the enemy cannot easily take over the control of its destination.

Having thus disclosed the general principle of the invention by illustrating several forms of apparatus which function to carry out that principle, it should be understood that other forms of apparatus may be used and that various changes, modifications and additions or omissions may be made so long as they do not depart from the spirit or scope of the invention and do not depart from the structures as expressed in the claims below. For instance, the rectifiers shown may be of any suitable construction, such as, vacuum tube, gas filled, copper-oxide or tantalum type. Other constructions for bringing the high frequencies of the currents down to values low enough to use them for the excitation of iron contained motors without destroying the frequency difference between such currents may be used. This may be done in successive steps, if desired, so that the mixing and filtering problem will become less difficult, and other substitutions may be made within the scope of the following claims.

What I claim as new is:

1. In an electronic measuring apparatus, the combination with an oscillator for generating radio frequency current, a transmitting antenna near said oscillator for radiating electromagnetic wave energy received from said oscillator, a receiving antenna near said oscillator but radio-responsively isolated therefrom, reradiating means which is at times near said antenna and which is at other times separated substantial various distances from such antennas for transmitting back to the receiving antenna some of the wave energy transmitted thereto, means including a rotatable means and including a winding for producing a rotating electro-magnetic field controlled in part by energy from said receiving antenna and in part by energy derived directly from said oscillator to cause rotation of said rotatable means in a direction and to an extent in accordance with each change in either direction in the number of cycles and fraction thereof of radio energy in transit over a path from said transmitting antennas to said reradiating means and then to said receiving antenna, and volume controlled means for controlling the volume of the energy generated by said oscillator and controlled by said rotatable means in accordance with the extent of its rotation.

2. In an absolute altimeter for measuring the absolute height an airplane is flying above the ground irrespective of the variation of the elevation of the ground above sea level, the combination with an electronic oscillator on said airplane for generating a high frequency radio current, a transmitting antenna energized from said oscillator and supported to transmit radio energy downwardly, a receiving antenna for receiving radio energy transmitted to the ground from said transmitting antenna and reflected back up from the ground, amplifying means for amplifying the radio energy received by said receiver, a rotatable indicator indicating both cycles and fractions of cycles, and a rotatable electro-responsive device including windings controlled in part by energy derived directly from said oscillator and controlled in part by energy derived in part from said amplifier and which windings are constructed and energized to produce a rotating magnetic manifestation which rotates said device in accordance with the difference between the cycles of radio current generated on the one hand and the cycles of radio current received by said receiving antenna on the other for operating said indicator to cause it to indicate every change in the number of cycles and fraction thereof of radio energy in transit between said transmitting antenna, the earth and said receiving antenna and constructed and energized to rotate in one direction if the number of cycles or fraction thereof in transit is increased and to rotate in the opposite direction if the number of cycles or fraction thereof in transit is decreased, whereby if said indicator indicates zero altitude when the airplane leaves the earth it will indicate the absolute altitude above the earth as measured by whole cycle wave length and fraction thereof at all times irrespective of the number of ascents and descents during its flight.

3. In an electronic measuring apparatus; the combination with an oscillator for generating radio frequency current; a transmitting antenna near said oscillator for radiating electro-magnetic wave energy from said oscillator; a receiving antenna near said oscillator; retransmitting means which is variable distances from said antennas for transmitting back to the receiving antenna wave energy transmitted thereto by said transmitting antenna; and differential apparatus including a rotatable rotor and windings controlled by energy received in part from said receiving antenna and by energy derived in part directly from said oscillator and in a manner to cause rotation of said rotor to an extent dependent on the difference between the number of cycles and fraction thereof of current transmitted by said transmitting antenna and the number of cycles and fraction thereof of current received by said receiving antenna and to cause rotation of said rotor in one direction if less cycles of current are received by said receiving antenna than are transmitted by said transmitting antenna and to cause rotation of said rotor in the opposite direction if the number of cycles of current received by said receiving antenna is greater than the number of cycles of current transmitted by said transmitting antenna during a period of time under consideration.

4. A distance measuring apparatus for measuring a change in the distance from such apparatus to a suitable radio energy retransmitting means comprising; an oscillator of the electron tube type for generating alternating current of high frequency; radio retransmitting means, means including a transmitting antenna for transmitting by radio radiation alternating current from said oscillator toward such radio retransmitting means; a receiving antenna near said transmitting antenna but radio responsively isolated therefrom and for receiving such alternating current from such radio retransmitting means due to energy originally transmitted thereto by said transmitting antenna; and electro-responsive differential means including a rotor and windings controlled by current derived in part from alternating current directly from said oscillator and in part by current derived from alternating current received by said receiving antenna from said retransmitting means, in a manner to cause rotation of said rotor to an extent of both the number of whole cycles and any particular fraction of a cycle of the difference between the number of cycles and fraction thereof of such alternating current transmitted from said transmitting antenna and the number of cycles and fraction thereof of alternating current received by said receiving antenna after the first cycle of such alternating current has reached said receiving antenna and due to a change in the distance from said antennas to said retransmitting means irrespective of whether such change in distance is an increase or a decrease and which rotor rotates in one direction if the change is an increase in distance and which rotates in the opposite direction if the change in distance is a decrease in distance.

5. Distance measuring apparatus for measuring variations in the distance from such apparatus to a suitable radio energy retransmitting means comprising; radio retransmitting means; an oscillator of the electron-tube type for generating alternating current of high frequency; a transmitting antenna near said oscillator for radiating electro-magnetic wave energy including such alternating current from said antenna to said radio retransmitting means, a receiving antenna near said transmitting antenna but radio receptively isolated therefrom and for receiving electro-magnetic wave energy including such alternating current from such radio retransmitting means as a result of emission of electro-magnetic wave energy by said transmitting antenna as a result of which said receiving antenna at any time has received as many whole cycles and fraction of a cycle of said alternating current as have been radiated by said transmitting antenna except the cycles and fraction of a cycle in transit between said transmitting antenna and said receiving antenna over a path from said transmitting antenna to said retransmitting means to said receiving antenna; and differential means including cycle and fraction of cycle integrating means including windings, a rotor and indicating means operated by said rotor, said windings being controlled by energy derived in part from said receiving antenna and energy derived in part directly from said oscillator and acting on said rotor to cause said indicator to indicate the difference between the number of cycles and fraction thereof of such alternating current transmitted by said transmitting antenna and the number of cycles and fraction thereof of such alternating current received by said receiving antenna, and acting on said rotors to cause said differential means to operate in one direction if the number of cycles of such alternating current received by said receiving antenna is less than the number of cycles of such alternating current transmitted by said transmitting antenna and to operate in the opposite direction if the number of cycles of such alternating current received by said receiving antenna is greater than the number of cycles of such alternating current transmitted by said transmitting antenna due to a change in the distance from such retransmitting means to said antennas.

6. A distance measuring apparatus for measuring variation in the distance from such apparatus to a suitable retransmitting means comprising; a transmitter including a transmitting antenna for transmitting by radio radiation a high frequency alternating current; a receiving antenna; retransmitting means for transmitting by radio radiation such high frequency alternating current back to said receiving antenna adjacent said transmitting antenna; whereby the retransmitted high frequency alternating current received by said receiving antenna is of the same frequency as the original alternating current when said retransmitting means is spaced a constant distance from said antennas, is of a lower frequency if said distance is increased and is of a higher frequency if said distance is decreased; and apparatus for integrating in cycles and fraction of a cycle the difference between the alternating currents transmitted and received comprising, means for producing a third high frequency alternating current which lags substantially ninety electrical degrees behind one of said two high frequency alternating currents, means including mixers and rectifiers for producing four direct pulsating currents one for each one-fourth Doppler cycle of the difference between the frequencies of the transmitted and received alternating currents which direct currents rise and fall in succession in accordance with such Doppler cycles and rise and fall in an order dependent on which of said alternating currents is of the higher frequency and which means has such two and said third alternating current applied thereto, means for amplifying each of said four direct currents, and electro-responsive rotatable means controlled by said amplified direct currents and rotated in a direction and to an extent dependent on the order and the rate of rising and falling of said amplified direct currents.

7. The invention as claimed in claim 3 wherein the windings of the differential apparatus are contained partly on the rotor and are partly stationary.

8. The invention as claimed in claim 3; and generating means for generating a radio frequency current different in frequency from the frequency of the current generated by the oscillator by a very small percent, two mixers one for mixing radio energies generated by said oscillator and by said generating means and the other for mixing energy generated by said generating means and energy received by said receiving antenna, and wherein the rotor and windings are parts of a frequency differential motor.

9. The invention as claimed in claim 3; and generating means for generating a radio frequency current different in frequency from the frequency of the current generated by the oscillator by a very small percent, two mixers one for mixing radio energies generated by said oscillator and by said generating means and the other for mixing energy generated by said generating means and energy received by said receiving antenna, a first filter in the output circuit of said first mixer for passing the difference frequency in such output circuit, a second filter in the output circuit of said second mixer for passing the difference frequency in such output circuit, and wherein the rotor and windings are parts of a frequency differential motor.

10. The invention as claimed in claim 3 wherein the retransmitting means comprises a second receiving antenna, an amplifier and a second transmitting antenna.

11. The invention as claimed in claim 10 wherein the antennas for transmitting electro-magnetic wave energy to the amplifier of the retransmitting means are polarized in a different plane than are the antennas for transmitting the electro-magnetic wave energy from such amplifier to the differential apparatus.

12. The invention as claimed in claim 3 wherein the retransmitting means comprises a second receiving antenna, a tuned receiver including an amplifier and a second transmitting antenna.

13. The invention claimed in claim 12 wherein the antennas for transmitting electro-magnetic wave energy to the tuned receiver of the retransmitting means are polarized in a different plane than are the antennas for transmitting the electro-magnetic wave energy from such tuned receiver to the differential apparatus.

OSCAR H. DICKE.

REFERENCES CITED

The following references are of record in the file of this patent:

UNITED STATES PATENTS

| Number | Name | Date |
| --- | --- | --- |
| 1,756,462 | Jenkins | Apr. 29, 1930 |
| 1,938,066 | Darbord | Dec. 5, 1933 |
| 1,959,264 | Dugan | May 15, 1934 |
| 1,969,537 | Alexanderson | Aug. 7, 1934 |
| 1,987,587 | Drake | Jan. 8, 1935 |
| 1,987,588 | Drake | Jan. 8, 1935 |
| 2,147,810 | Alford | Feb. 21, 1939 |
| 2,173,897 | Clavier | Sept. 26, 1939 |
| 2,183,399 | Heising | Dec. 12, 1939 |
| 2,198,113 | Holmes | Apr. 23, 1940 |
| 2,248,727 | Strobel | July 8, 1941 |
| 2,266,410 | Busignies | Dec. 16, 1941 |
| 2,268,643 | Crosby | Jan. 6, 1942 |
| 2,298,621 | Holland-Letz | Oct. 13, 1942 |
| 2,314,851 | Barney et al. | Mar. 23, 1943 |
| 2,361,686 | Gudie | Oct. 31, 1944 |
| 2,368,551 | Labin | Jan. 30, 1945 |
| 2,396,112 | Morgan | Mar. 5, 1946 |
| 2,411,520 | Capen | Nov. 26, 1947 |
| 2,418,465 | Doba | Apr. 8, 1947 |
| 2,481,492 | Bjarnason | Sept. 13, 1949 |
| 2,470,787 | Nosker | May 24, 1949 |